United States Patent Office 3,098,834
Patented July 23, 1963

3,098,834
PREPARATION OF WATER-SOLUBLE OIL-RESIN VEHICLES
Robert D. Jerabek, Allegheny County, Pa., assignor to Archer-Daniels-Midland Company, a corporation of Delaware
No Drawing. Filed June 2, 1960, Ser. No. 33,368
7 Claims. (Cl. 260—23.7)

This invention relates to true oil-resin varnishes which can be diluted with water. They can be used either as true varnishes to give a transparent film or can be used as a vehicle with pigments. In either case they will form coatings with a flat to a high gloss surface. This application is a continuation-in-part of my copending application Serial No. 531,250, filed August 29, 1955, and now abandoned.

The particular type of oil-resin varnishes to which this application relates are those in which the base is a glyceride drying-oil modified with cyclopentadiene resins. Cyclopentadiene is ordinarily obtained as an incident to certain phases of petroleum refining and is ordinarily produced as a mixture of monomeric cyclopentadiene and the dimer, dicyclopentadiene. There may also be present some of the homologues such as the methyl cyclopentadiene and its dimer. Small amounts of resin forming bodies of the vinyl type such as polystyrene may also be present.

In the process of the present invention the drying-oil may be modified with either cyclopentadiene itself or with a methyl homologue thereof or with polymers of these materials taken either separately or in mixture. For example, one may use the mixture in the form derived from petroleum refining. When modifying the drying-oil with any of these forms of cyclopentadiene, one may use either the monomeric form which is mixed with the oil and polymerized or a partially polymerized form may be used which is heated with the oil to give the desired body. Such varnish resins ordinarily will have an acid number of less than about 30. It is my intention that varnishes made from usual glyceride drying-oil varnishes modified in these ways with any of these forms of cyclopentadiene be embraced within the term "cyclopentadiene modified drying-oil varnishes."

Oil varnishes of these types made from such oils as linseed oil, dehydrated castor oil, soya bean oil and the like are, of course, well known. The present invention relates to a method whereby any of these various cyclopentadiene modified drying-oil varnishes are rendered water soluble so that they form clear transparent solutions which can dry to give transparent films.

The first step in this process consists in reacting the oil-resin varnish with an unsaturated alpha-beta ethylenic carboxylic acid. The unsaturated alpha-beta ethylenic acids (or their half esters) which I use are represented by compounds such as maleic, fumaric, itaconic, citraconic, crotonic, acrylic and sorbic acids, monobutyl maleate and the like and the corresponding anhydrides thereof.

In this case the alpha-beta unsaturated ethylenic acids are reacted with the finished oil-resin component and the reaction takes place primarily between the points of unsaturation of these acids and the drying oil radicals. The remaining free acidity of the ethylenic acid imparts the necessary base reactivity to the oil-resin molecules for the next step in the process. In order to have this reaction between the acids and oil-resin component follow its proper course and to keep to a minimum the formation of ester bodies, relatively high temperatures should be employed. Generally speaking this reaction should be carried out at a temperature above 430° F. and preferably at about 450° F. or somewhat higher, say up to about 530° F. By this reaction drying-oil-resin varnishes bodies are produced having a high acid number. The acid number that is obtained is controlled by the amount of acid used.

On this score the amount of acid should be enough so that the acid number of the oil-resin compositions will be brought to between about 30 and 175. That means that they should be capable of taking up between 30 and 175 milligrams of KOH per gram of non-volatile ingredients. Within this broad range of acid number a preferred range is to bring the acid number to between about 40 and 125 and this controls the amount of acid to be added.

The next step in my process is that the acidity incident to or produced in the oil-resin system is neutralized with amonia or an amine which may range in amount between 80% and 150% of the theoretical amount required for neutralization.

If the vehicle is to be used for air drying compositions, it is desirable that the neutralizing amines be sufficiently volatile at room temperature to leave the oil-resin base when deposited as a film. Ammonium hydroxide can be used for this purpose, or the more volatile strongly basic organic amines such as monoethyl amine, triethylamine and the like. In the case of baking finishes, one can use such strongly basic organic amines with lower vapor pressure. Thus non-volatile amines with a multiplicity of hydroxyl groups, for example amino alcohol (such for example as tris(hydroxymethyl)aminomethane) are especially beneficial in baking finishes since these compounds have an ability to cross-link by esterification or amidification.

When the ammonia compound is added to the acid oil-resin compound there is produced what may be termed a salt. These salts are dispersible in water but they are not truly soluble and will not give the desired result. In order to achieve a true water-solubility of the acidified and neutralized film formers of this invention, a co-solvent or coupling solvent, as I prefer to call it, is also necessary. These solvents contain ketone, ether, hydroxyl, or ester groups, either singly or in combination, one with the other. The coupling solvents are further defined as being those substances which are water miscible and also are solvents for the film-forming components of this invention. Some typical solvents which can be used to achieve the ends of this invention are of the following types:

*Cellosolves.*—Monomethyl to monobutyl glycol ethers, methyl Cellosolve acetate.

*Carbitol.*—Monomethyl to monobutyl di-ethylene glycol (ethers), Carbitol acetate.

*Alcohols.*—Methyl, ethyl, isopropyl, diacetone, hexantriol.

*Glycols.*—Ethylene, propylene, hexylene, diethylene, triethylene, dipropylene.

*Esters.*—Methyl acetate, ethyl lactate, triethyl phosphate, methoxy triglycol acetate, ethylene carbonate.

*Ethers.*—Dioxane, 3-methoxy butanol, 1,2,6-ethoxy triglycol, tetrahydropyran 2-methanol.

*Sulfur compounds.*—Mercapto-ethanol, thioglycol.

*Polyethoxylated compounds.* — Substituted phenols, rosins, etc.

*Miscellaneous types.*—Dimethyl formamide.

These coupling solvents may be summed up as forming a group consisting of organic aliphatic alcohols, thio-alcohols, ethers, ketones and esters, polyoxyethylated phenols and rosin acids, organic phosphates and amides having from 1 to 20 carbon atoms.

While some alcohols are given in the above list, they are not fully serviceable alone as solvents but when used preferably are incorporated with other materials in the list.

The amount of the coupling agent employed is not critical but will vary depending upon the coupling agent and the groupings in the neutralizing ammonia compound. It is very simple to find the amount of the coupling agent that must be added in order to cause the compound to dilute readily with water. It is preferable that the smallest modification necessary to achieve this result be used both for reasons of economy and because there is less volatile material to be driven off when the film is forming. However, as stated, the amount of coupling agent is not critical and the product has value even if the minimum amount is doubled. The order in which the neutralizing material and the coupling agent are added is not critical and if desired they can be added at the same time. The solution of the neutralized salt and the coupling solvent is preferably diluted with water. Since the product is usually infinitely dilutable with water, the amount of water can vary over wide limits and is a function of the use of the product as a clear or pigmented finish. In the total thinned vehicle the water content is usually in the range of from 10% to 90%. The preferred water content is between 35% and 70%. These water solutions are substantially clear in concentrated form. At certain dilutions certain vehicles may show slight opalescence.

The water thinned vehicles of this invention can be treated in various ways to alter or impart definite properties to the films which they form. Thus, driers, optical bleaches, ultra-violet screening agents and fungistats can be added.

The vehicles of this invention find wide use in pigmented coating compositions. Conventional paint grinding equipment e.g. pebble and roller mills can be used to incorporate various pigments into the water soluble vehicles.

There is no practical limitation on the type and quantities of usual pigments which can be used. This is governed by the end use of the finish, namely, whether interior flat, semi-gloss, high-gloss, architectural or industrial coatings are desired.

Both clear and pigmented coatings can be applied by brushing, spraying, dipping and roller coatings. The coating formulation can be adjusted to any one of the methods of application. Further, these coatings can be air dried or baked, depending upon the end use. There is no unusual limitation on the nature of the substrate to which the coatings can be applied; thus, wood, metals, glass, masonry, plasterboard, etc. are examples.

The vehicles and pigmented compositions are especially unique for coating ferrous metals. Although they are aqueous systems, they are non-corrosive and show good package stability when stored in tin-plated cans.

It is particularly to be emphasized that the products of this invention are not dispersions or suspensions such as is the case with many of the so-called water paints now on the market. Although those known suspensions form glossy transparent films with the hardness and strength of the oil-resin films, they do not have proper ability to wet the pigments to form high gloss finishes when combined with pigments.

The products of this invention do not contain proteinaceous materials such as caseins, soy proteins, starches and the like which remain water and alkali-soluble in the applied film. The products of this invention, when once the ammonia compounds and coupling agents have evaporated, readily convert by air oxidation or baking to water or alkali-insoluble films.

In the foregoing description of my invention I have described various materials that may be used and their equivalents and ranges, limits and conditions within which my invention may be practiced. In the following examples I set forth the best mode contemplated by me of carrying out my invention but it is to be understood that these examples are not to be taken as limiting my invention.

*Example 1*

This example illustrates the preparation of a water soluble cyclopentadiene-linseed oil copolymer vehicle.

| | Parts |
|---|---|
| Cyclopentadiene-linseed polymer (based on 80% linseed oil) | 900 |
| Maleic anhydride | 100 |

The copolymer, oil and maleic anhydride were heated to 450° F., with agitation and held for 45 minutes. The adduct was then cooled to room temperature and treated as follows:

| | Parts |
|---|---|
| Acid adduct prepared above | 10 |
| Butyl Cellosolve | 4.3 |
| 26° Bé. aqua ammonia | 1.2 |
| Water | 13.1 |

The adduct was dissolved in the butyl Cellosolve, neutralized with ammonia and diluted with water.

This final 35% non-volatile solution was clear and homogeneous and capable of further dilution without impairing its properties.

The clear vehicle was treated with 0.1% Mn as naphthenate. A film cast on glass set to touch in 30 minutes and showed only a slight tack in 8 hours. It was tackfree, hard, tough and glossy overnight. It was resistant to the action of household soaps.

*Example 2*

This example illustrates the preparation of a ferrous metal primer based on the vehicle of Example 1.

| | Parts |
|---|---|
| Vehicle (Example 1) | 160 |
| 98% red lead | 100 |
| Magnesium silicate | 50 |
| Red iron oxide | 12.5 |
| 6% Mn naphthenate | .5 |
| Water | 40 |

The pigments and 60 parts of the vehicle were mixed and passed through a conventional 3-roll paint mill. The resultant paste was diluted with the remaining vehicle and water and drier.

The resulting primer when applied over ferrous metal air dries to a tough, hard, adherent film. No corrosion of the metal was observed either immediately after application or after drying and exterior exposure.

*Example 3*

In this example castor oil was modified with a cyclopentadiene resin made by polymerizing a mixture containing cyclopentadiene monomers and dimers and some methylcyclopentadiene together with a small amount of styrene. Such a resin, having a melting point of 110–130° C., acid number less than 2, saponification number 0, iodine number 120, average specific gravity at 25° C. 1.113, is sold by Neville Chemical Company under the trademark Neville LX 685. The ingredients used in this example were:

| | Parts |
|---|---|
| Dehydrated castor oil | 200 |
| Neville LX 685 resin (described above) | 100 |
| Maleic anhydride | 32 |
| Diacetone alcohol | 50 |
| Isopropyl alcohol | 116 |
| Monoethylamine (72.5% aqueous) | 32 |
| Water | 420 |

The resin and oil were heated to 550° F. and held 30 minutes. After cooling to 300° F. maleic anhydride was added, the temperature was raised to 450° F. and held 30 minutes. After cooling to room temperature the alcohols were added, followed by the monoethylamine and water.

The clear solution contained 35% non-volatiles and was only very slightly opalescent when reduced to 17–18% non-volatile with water.

The vehicle was treated with 0.05% Co and 0.05% Mn as naphthenates and 0.5% Activ 8 as driers. A 3-mil film cast on glass was dried at 200° F. for 1 hour to yield a glossy, tack-free soap-resistant coating.

As stated above, foregoing examples are given for the purpose of illustrating my invention and showing preferred manners in which it may be employed but it is understood that the same may be modified in many particulars and applied to many other ingredients and products.

What I claim is:

1. A method of preparing cyclopentadiene modified drying-oil varnish composition which is dilutable with water and forms a true water solution, which comprises reacting a cyclopentadiene modified drying-oil varnish resin having an acid number of less than about 30, and containing in the resin molecule residual unsaturated groups derived from the drying oil and reactive with the ethylenic group of alpha-beta unsaturated ethylenic carboxylic acids, with an alpha-beta-unsaturated ethylenic carboxylic acid in an amount sufficient to increase the acid number of the varnish resin to within the range from about 30 to about 175, the said reaction being carried out at a temperature within the range from about 430 to about 530° F. for from about fifteen minutes to about one hour, substantially neutralizing the free acid groups of the resinous reaction product with a volatile ammonia base selected from the group consisting of ammonia and strongly basic organic amines, thereby producing the corresponding salt of the ammonia base and the acidic resinous reaction product, and incorporating therewith, in an amount sufficient to form a water-dilutable resin varnish an organic coupling solvent miscible with water and in which the varnish resin is soluble, selected from the group consisting of organic aliphatic alcohols, thioalcohols, ethers, ketones and esters, polyoxyethylated phenols and rosin acids, organic phosphates and amides having from one to twenty carbon atoms.

2. A method as specified in claim 1 in which the amount of the carboxylic acid used is sufficient to increase the acid number of the varnish resin to within the range from about 40 to about 125.

3. A process in accordance with claim 1 which includes diluting the resulting varnish with from 10 to 90% of water by weight.

4. A method as specified in claim 1 in which the cyclopentadiene modified drying-oil varnish comprises a glyceride drying-oil modified with a mixed cyclopentadiene comprising cyclopentadiene, the methyl homologue of cyclopentadiene and polymers thereof.

5. A cyclopentadiene modified drying-oil resin varnish composition which is dilutable with water to form a substantially clear solution and which will dry and harden by oxidation and polymerization to form a water-insoluble film said composition consisting essentially of the substantially neutral salt of (1) an acidic reaction product having an acid number of within the range from about 30 to about 175 of an alpha-beta-unsaturated ethylenic carboxylic acid and a cyclopentadiene modified drying-oil varnish resin containing in the molecule residual unsaturated groups derived from the drying oil and reactive with the ethylenic group of alpha-beta-unsaturated ethylenic carboxylic acids, said reaction product being the product of reaction of said unsaturated groups and ethylenic groups of said alpha-beta-unsaturated acid, and (2) a volatile ammonia base selected from the group consisting of ammonia and strongly basic organic amines, in solution in a sufficient amount of a coupling solvent to dissolve and convert the neutral salt to a water-dilutable varnish, said coupling solvent being miscible with water and selected from the group consisting of organic aliphatic alcohols, thioalcohols, ethers, ketones and esters, polyoxyethylated phenols and rosin acids, organic phosphates and amides having from one to twenty carbon atoms.

6. A composition as specified in claim 5 in which the substantially neutral salt is of an acidic reaction product having an acid number within the range from about 40 to about 125.

7. A composition in accordance with claim 4 diluted with from 10 to 90% water by weight.

References Cited in the file of this patent
UNITED STATES PATENTS 2,398,889     Gerhart  ---------------- Apr. 23, 1946
2,681,894     Hoenel  ---------------- June 22, 1954